United States Patent [19]

Perrotta

[11] Patent Number: 4,763,129
[45] Date of Patent: Aug. 9, 1988

[54] SS-TDMA TECHNIQUE TELECOMMUNICATION SATELLITE SYSTEMS

[75] Inventor: Giorgio Perrotta, Rome, Italy

[73] Assignee: Selenia Spazio SPA, L'Aquila, Italy

[21] Appl. No.: 26,611

[22] PCT Filed: Jun. 5, 1986

[86] PCT No.: PCT/IT86/00041
§ 371 Date: Feb. 5, 1987
§ 102(e) Date: Feb. 5, 1987

[87] PCT Pub. No.: WO86/07512
PCT Pub. Date: Dec. 18, 1986

[30] Foreign Application Priority Data

Jun. 6, 1985 [IT] Italy .................................. 48177/85

[51] Int. Cl.⁴ ............................................. H04B 7/185
[52] U.S. Cl. ..................................... 342/356; 370/104; 455/12
[58] Field of Search .............................. 342/353–355, 342/358, 359; 370/77, 104, 100; 455/12, 13, 25

[56] References Cited

U.S. PATENT DOCUMENTS

| | | | |
|---|---|---|---|
| 4,150,335 | 4/1979 | Cooperman | 342/353 X |
| 4,181,886 | 1/1980 | Cooperman | 342/353 X |
| 4,188,578 | 2/1980 | Reudink et al. | 342/353 X |

OTHER PUBLICATIONS

National Telecommunications Conference (NTC); vol. 4, 1981, New Orleans; IEEE; Drioli et al.; "Access Technique for the ITALSAT SS-TDMA System", G2.4.1–G2.4.3.

Primary Examiner—Theodore M. Blum
Assistant Examiner—Bernarr Gregory
Attorney, Agent, or Firm—Karl F. Ross; Herbert Dubno

[57] ABSTRACT

Improvement to satellite telecommunication systems using SS-TDMA (Satellite Switch Time Domain Multiple Access) technique equipped with on board regenerative repeaters consisting of: 1. Transmitting from ground to the satellite a signal (CM) with high frequency stability and in harmonic relationship with digital data rate by modulating the carrier sent by a beacon station for fine tracking of on-board antennas. The signal (CM) being synchronized to the plesiochronous clock (CPL) common to all ground stations is used for: a. on board bit re-synchronization of the data stream after demodulation and re-generation on board of the asynchronous data arriving at the satellite; b. synchronization of reference words related to start of frames sent by the satellite. 2. Modulating the signal CM with digital signals, to be used as high speed telecommand which operate in a totally independent way of the telecommand system usually adopted for satellite control.

4 Claims, 3 Drawing Sheets

SS-TDMA TECHNIQUE TELECOMMUNICATION SATELLITE SYSTEMS

CROSS REFERENCE TO RELATED APPLICATIONS

This application is a National Phase application of PCT/IT86/00041 filed June 5, 1986 and based, in turn, on an Italian National Application No. 48177 filed June 6, 1985 under 35 USC 119 and the International Convention.

FIELD OF THE INVENTION

My present invention relates to satellite-switched time-division multiple-access communication systems and, more particularly to a system utilizing the RF beacon signal as a carrier for a clock-generating on-board synchronization signal and the telecommands for the switching circuitry on board the satellite.

BACKGROUND OF THE INVENTION

Within satellite telecommunication systems using simultaneously SS-TDMA (satellite-switched time-division multiple access) on-board multiple beam antennas, incoming traffic switching from each of the communication receiving beams onto each of the communications transmitting beams, is achieved through a switching matrix, whose task is to determine, in a cyclic manner, the origin-destination interconnections required by the time plan, generally synthesized at the ground station starting from the traffic requirement and its evolution, and sent to the satellite via telecommand.

In telecommunication systems which adopt SS-TDMA and multibeam antennas as well as demodulation, regeneration and demodulation techniques on board, together with digital modulation of signals, the switching matrix acts directly upon demodulated and on board regenerated binary data.

In this case, switching must be such that the significant part of the transient message through the satellite is not disturbed: in particular, state transitions within the switching matrix must take place during "guard times" between ground station emission bursts. To optimize the frame filling efficiency it is convenient to keep guard times short; therefore there must be a mutual time synchronization between the on board clock, which sets the matrix switching operation, and burst emissions toward the satellite by the ground stations.

If besides traffic switching operations on satellite, also processing of digital signals takes place, such as, for example, decoding, reformatting, change of signalling or data rate change operations, it is almost indispensable to perform these operations at the same speed for all data streams arriving to the satellite and a speed which is as close as possible to the signalling speed (symbol speed) of the digital streams arriving at the satellite.

Due to ground oscillator instability and Doppler effect induced frequency shifts in the ground to satellite path, due to satellite residual movement around its station point, data streams arriving to the satellite are asynchronous (in frequency and phase). It is therefore necessary to perform a resynchronization of these streams before proceeding with further processing.

In on board switching systems which also require fast time plan reconfiguration, or origin to destination interconnections from frame to frame, to cope with demand assignment of satellite capacity, it is necessary to send to the satellite a number of compounds for the dynamic reconfiguration of the switching matrix on the order of several thousands per second. This signalling requirement largely exceeds the satellite telecommand capability which, at the very best, is of the order of a few hundreds of bits per second. Therefore it is necessary to provide alternative systems to effect this information data transfer between ground and satellite.

Below I will discuss some of the known solutions for bit and pattern synchronization.

These two main problems (bit synchronization and pattern synchronization), arising from differing operational requirements, may be solved simultaneously if we can find a way to deliver to the satellite a very stable signal which is close (or identical) to the digital stream symbol frequencies sent to the satellite, which simultaneously:

(a) synchronizes all asynchronous data streams arriving at the satellite; and (b) acts as a reference frequency signal to be used in the switching matrix timing circuits through successive divisions.

At least three techniques are known through which the above may be developed. However they all have significant drawbacks.

A short description of these known techniques follows, to highlight the advantages which are offered by the method of this invention.

(1) Stable autonomous source method.

Frequency drifts are controlled through telecommands. This method relies upon the use, on board, of a very stable frequency source usually based upon a temperature compensated quartz oscillator.

To minimize frequency drifts due to temperature fluctuations on board, a very sophisticated proportional thermostatic control of the oscillator is required, which implies considerable mass and power onsumption. Both of these factors are detrimental on board as satellite. Moreover, even with the very best proportional thermostats, one cannot achieve the desirable limits for frequency drift, which must be less than $10^{-8}$ as explained below. A further negative feature is crystal ageing, which may imply large frequency drifts, which are also seldom predictable.

Consequently fine frequency control system of the reference generator has to be adopted, relying upon telecommand.

Unfortunately, the fine frequency control telecommands of the reference generator must be sent to the satellite at a rate which is greater to the extent that the oscillator temperature control system is "looser".

Accordingly, if from a power consumption and weight viewpoint one tried to simplify the oscillator temperature control, this would require recourse to frequent telecommands to maintain its frequency within the required limits around the nominal values.

To make frequent recourse to telecommands is also a negative factor from an operational viewpoint, as it implies:

(a) a groundbased measurement and control system for the on board reference generator, of the direct or indirect type (satellite transmitted symbol frequency measurement);

(b) the use of operational procedures to process this information and the preparation of telecommands to be sent to the satellite;

(c) the frequent use of the telecommand channel;

(d) the on board use of additional circuitry for active control of oscillating frequency after telecommand reception and decoding, with negative impact on reliability.

(2) Extraction of signalling frequency from the bursts delivered by one of the network stations.

This method implies the adoption of one of the burst emissions sent to the satellite in TDMA (time division multiple access) as a reference for system synchronization.

The system is locked onto the signalling (symbol) frequency of the data stream transmitted, i.e. by one of the ground stations.

As communications station emissions consist of bursts, on board there is no time continuity of the reference signal.

Therefore the on board reference signal recovery system is basically a time sampled phase locked device.

In other words this circuit, for each useful burst reaching the satellite, must:

reacquire the reference signal frequency;
shift to the reference frequency track mode;
perform frequency measurement during the remaining part of the burst;
compare it with the measurement taken during the corresponding burst in the previous frame; and
generate a correction signal, if required, to set the frequency of the reference oscillator.

During the time between two successive bursts, one can adopt a memory device which will avoid sudden frequency shifts when the phase locked loop is opened without the input signal being present.

The memory device time constant must be much larger than the time between bursts if we want to avoid that the oscillator drifts excessively from the desired lock frequency (the oscillator will attempt to work asymptotically around its natural frequency, which differs from the reference signal frequency, due to age or temperature effects).

Unfortunately, a very long time constant which is required for open loop operation, does not tally with the need for wide band during reacquisition and closed loop frequency tracking, i.e. in the presence of an input signal when the new burst arrives.

Therefore the circuit must include a device which inserts or removes the memory circuit depending upon whether the input signal, onto which the phase locked circuit must lock, is present; or, in an equivalent manner, the phase locked circuit must switch bandwidth depending on the presence or absence of the signal.

There are some substantial problems in the practical development of such a system in an operational situation.

The first is related to the detection of the presence of the signal to be locked before switching bandwidth (excluding the memory). Unless there is a way, on board, to know a priori which time window containing the master station burst will appear at the circuit input, it will be necessary to add further circuitry to detect signal presence and to consequently switch the loop bandwidth, with the consequent circuit complexities, reliability reduction, weight and power consumption increase.

A second aspect is related to input signal and digital demodulator threshold phenomena which act upon the signal before it reaches the circuit.

To understand this aspect, we must remember that a system which has to lock onto the data stream symbol frequency of a station assumes that we are working upon the data stream output by a digital demodulator.

Independently of the latter's specific construction, we can state—without losing general applicability—that the demodulator works correctly only when the modulated carrier to thermal noise ratio (C/No) is greater than a preestablished threshold.

Correct operation is when the demodulator provides a data flow from which one can still extract information tied to the input signal symbol frequency. Only under this condition can the reference signal recovery circuit—which operates on the residue recognizable component, at the arriving signal symbol frequency—operate correctly with a jitter which depends on the signal-to-noise ratio established at the demodulator output.

Below the demodulator threshold, there is no assurance that the demodulator will provide a significant output to recover the reference signal.

It can be easily understood how in the presence of large fading effects (i.e. as when carrier frequencies in the 20/30 GHz bands are used) due to atmospheric conditions, the demodulator may be working below threshold at the same time the bursts are delivered by the ground station.

The system would lose synchronization, since master station signalling frequency lock-on cannot be achieved.

3. Lock onto a signalling frequency.

Another synchronization system locks onto a signalling frequency which corresponds to the average of the signalling frequencies of more burst emitting stations, contained within one of the communication antenna beams.

An improvement to the method above is to perform lock-on so as to use all bursts, sent by all stations within the area covered by one of the communication antenna beams, which are demodulated, in time sequence by one demodulator.

The average of this method is that it is extremely unlikely that all stations will be simultaneously affected by anomalous propagation effects, implying carrier-to-noise ratios below the demodulator operational threshold.

Therefore, on the average, within the TDMA frame raster there will be many bursts having very good C/N ratios. These bursts will have differing signalling frequencies (due to the above mentioned Doppler effects and to the inevitable digital flow signalling frequency differences) but, in a plesiochronous network, such differences are generally very small.

Therefore an average signalling frequency and an average C/No ratio greater than the demodulator threshold value can be defined.

The phase locked loop circuit, under such conditions, will work better because the ratio between useful input signal presence to absence is almost unity.

It follows that the phase locked circuit does not necessarily need auxiliary circuits for frequency reacquisition and bandwidth switching, because it can be designated to track the average signalling frequency defined in the presence of C/No goog ratios. Unfortunately, the major drawbacks of this solution are that:

firstly it depends on the number of stations active and operating within the antenna beamwidth considered; and secondly it depends on the degree of activation (burst emission) of the communication stations.

System effectiveness in fact increases with the number of active stations, while, in the extreme case, it may coincide with that of the system presented in paragraph 2 (supra) when only one stations is present within the area covered by the beam.

Furthermore it can easily be understood how the system may not provide adequate performance unless the number of stations is in excess of 3 to 5, also considering that the TDMA frame filling factor cannot be unity. In other words, traffic stations may not transmit bursts so as to fill the frame completely. Consequently this system may be interesting only when there are many stations per antenna beam or, in the case of few (3 to 5) stations per beam, when the average station activation factor which implies a TDMA frame filling factor is close to unity.

These two considerations are really much more important than might seem to be the case at first sight:

(1) The condition that the ground terminal population within the area covered by the antenna beam is limited can often occur.

To say the least, this is the situation during the first years of system in operation, when the number of stations put into service increases gradually from a small number of prototypes to a preseries batch.

System operation must be demonstrated from the first phases of the exercize. Therefore a system which to operate assume that steady state will be reached asymptotically is neither optimum nor practical.

(2) The station activating factor may vary considerably depending on the type of services offered, in particular in presence of telephone and nontelephone mixed traffic.

It may in fact happen that the greater part of stations usually adopted to sort telephone traffic, are muted to give way to a different type of communication via satellite (such as high definition TV program or teleconferences). Band occupancy, which is equivalent—in time—to the emission of very long bursts by part or by all stations affected by this type of communication, brings the system back to a situation with one or two stations per antenna beam, therefore equivalent to the situation described under consideration 2.

KNOWN SOLUTIONS TO THE PROBLEM OF HIGH SPEED TELECOMMAND TRANSMISSION

As to the problem of sending a high speed telecommand data stream to the satellite, a system which relies upon the transmission by the master station of one or more dedicated bursts—within the TDMA frame—to be decoded on board the satellite is known. This system can achieve information rates of the order of many tens of Kbits/sec. The solution is rather an elegant one and does not imply appreciable drawbacks in terms of TDMA frame efficiency.

However the system has at least two considerable drawbacks:

(1) Circuit complexity

Because the telecommand flow is sent by bursts within the communication bandwidth and therefore at the communications data flow digital modulation speed, on board decoding of the bursts dedicated to telecommands implies the development of devices which at least in part, are based upon very fast logic and therefore with power consumption and reliability worse than when the circuits use digital components for operational speeds dimensioned for the effective information signalling speed.

(2) Presence of a threshold effect

The presence of a demodulator for input digital modulation bursts demodulation implies that there is also a threshold effect.

Which is to say that below a given C/No value, the demodulator will not provide significant output and therefore fast telecommand is not possible.

But even above threshold the C/No ratio may take on such low values in realistic operational conditions, that correct detection of telecommand messages and minimization of false commands, implies the application of code-decoding systems which detect and correct errors having considerable complexity, which is anyway greater than in the case where the original information flow (which is characterized by speeds in the order of a few Kbit/sec) may be sent to the satellite within a bandwidth compatible with the base band information rate.

SUMMARY OF THE INVENTION

The communication system havig SS-TDMA access, according to the invention, is generally characterized by having multibeam antennas on board the satellite, having high directivity. Antenna beam pointing controls, which usually have a $-3$ dB gain beam width less than arc degree—must take into account that RF sensors are used to detect and measure the instantaneous angle error between beacon signal direction of arrival from a ground station and the sensor electrical boresight.

To this end, there must be a beacon signal receiver on board to demodulate the ground station beacon signal dedicated to this specific function.

Therefore, with a slight increase of groundbased and on board equipment, I can also "transport" to the satellite a stable reference signal and a data stream for the high speed telecommand.

BRIEF DESCRIPTION OF THE DRAWING

The invention will now be described with reference presently preferred implementations intended to illustrate but the accompanying drawing in which:

In FIG. 1 the ground based plesiosychronous clock distribution network CPL links communication stations SC and beacon stations $B_1$, $B_2$.

Figure 1:
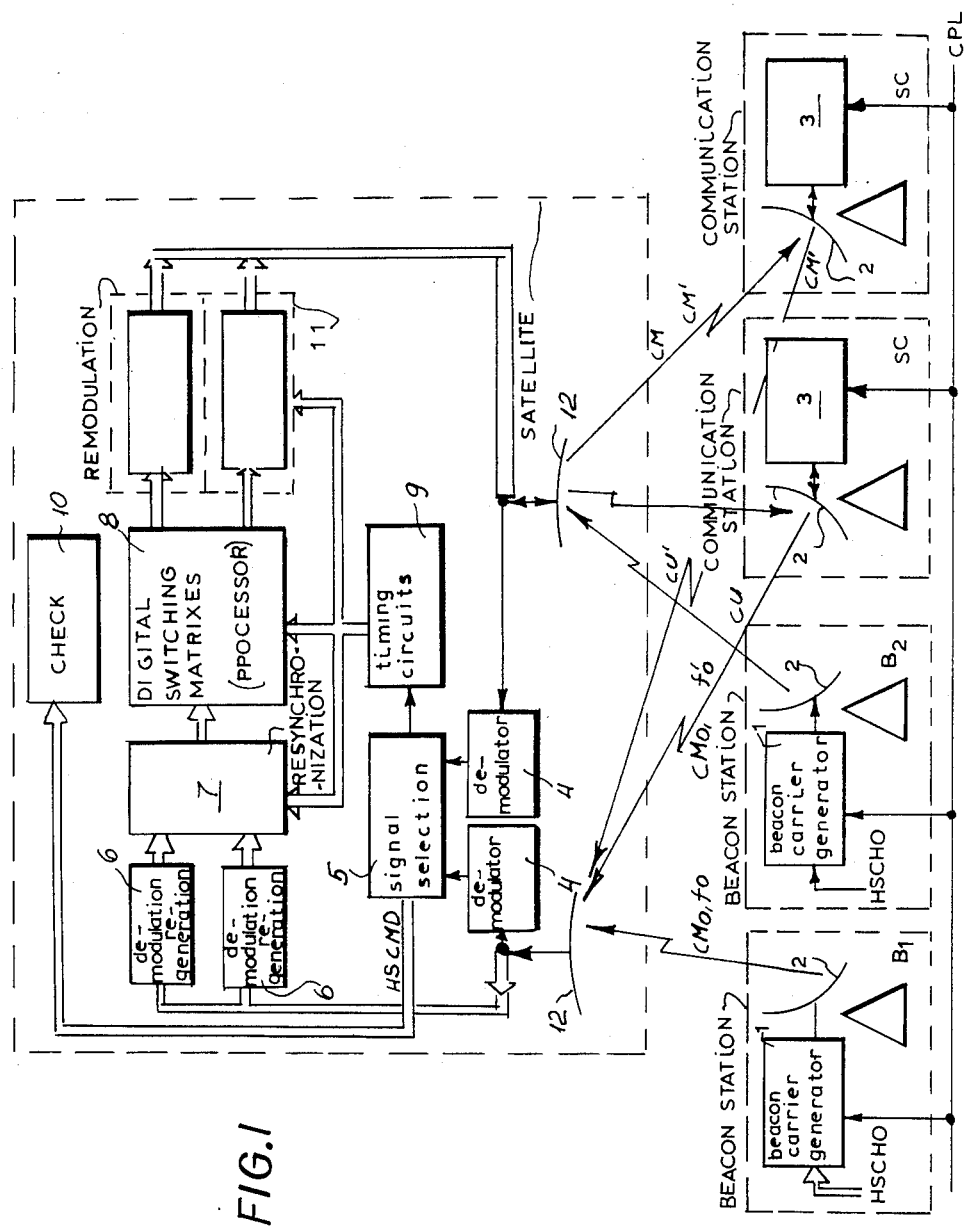
FIG. 1 is a block diagram of the entire on board and groundbased telecommunication system.

The arrow CMO shows the reference signal frequency sent from ground while arrow CM is the reference signal frequency as received by the satellite and arrow.

CM' is the CM reference signal frequency retransmitted by the satellite SAT as received by the SC communication stations.

At the beacon station the beacon carrier generator 1 produces signals (fo, fo'), CMO signal modulation on the beacon carrier and optional modulation of HSCMD (high speed telecommand) signals onto the CMO subcarrier.

Groundbased antennas (beacon & communication) 2 are provided for the ground stations $B_1$, $B_2$, SC and the transceivers and modems 3 for the digital streams sent to the satellite with uplink signalling speed (CU, CU') and received by the satellite at the downlink signalling speed.

CM' are connected with the antennas 2 of the communication stations SC. The on board demodulation units 4 on the satellite SAT respond to the carrier fo, fo' for CM signal recovery and optional HSCMD.

The demodulators 4 are connected to device 5 for adaptive selection of the better of the two signals coming from the two demodulators 4, when both are included in the system and operating simultaneously. An on board antenna 12 also sends the digital stream from stations SC to the digital stream from stations SC to the digital streams demodulation and regeneration equipment sent from stations SC at signalling speed CU, CU'. The demodulator/regenerators 6 output to a device 7 for bit resynchronization of all asynchronous flows present at demodulator 6 outputs with a common clock signal CM.

The processing equipment 8 usually present in SS TDMA systems such as digital flow switching matrixes, are connected to the resynchronization device 7 while the SS-TDMA system timing circuits 9 provide:
(a) synchronization of data streams entering block 8;
(b) on board generation of frame reference words common to all data streams;
(c) generation of switching timing within the TDMA frame in block 8;
(d) synchronization of bits in block 11 which remodulates digital data streams outputted by block 8.

A device 10 serves to check operation of the processor 8, and requires commands sent from the ground for its reconfiguration.

The aforementioned unit 11 effects remodulation of the digital data streams coming from the satellite, demodulated and regenerated in block 6, resynchronized in 7, switched in 8—before being sent to communication stations SC by means of transceiver antennas 12.

Figure 2:
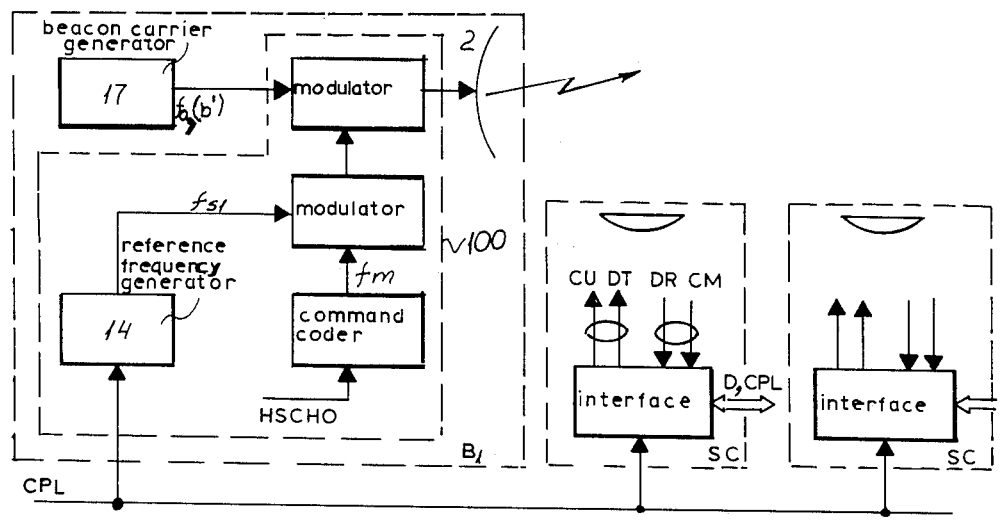
FIG. 2 is a block diagram of the beacon station.

FIG. 2 shows the interface circuits 13 within the communication station SC, between satellite transmitted (DT, CU) and received (DR, CM) data streams and those sorted on ground (D, CPL);
DT stands for data transmitted to the satellite at local signalling rate CU;
DR stands for data received by the satellite at signalling rate CM';
D stands for on ground sorted data at signalling rate CPL.

A beacon carrier generator 17 produces the beacon carrier fo. The area 100 relevant to blocks to be added to achieve the function of reference signal and high speed telecommand transport from ground to satellite, includes:
circuits 14 which generate an ultrastable reference frequency $f_{S1}$, locked to the plesiochronous clock frequency CPL, such that it operates in harmonic ratio with the nominal signalling frequency for the data streams sent to the satellite;
an HSCMD-command encoder 15 for the commands to be sent to the satellite.

The base band signal output from block 15 is fm;
a modulator 16 for modulating the subcarrier $f_{S1}$ modulator with a signal fm, (In one of the preferred forms of the invention, the modulation is BPSK (Binary Phase Shift Keying) without loss of general application); and
a modulator 18 for modulating the carrier fo by subcarrier $f_{S1}$, modulated in turn by signal fm. The type of modulation preferred in this invention, is phase modulation with modulation index such as to cause carrier fo attenuation not greater than 4 to 6 dB with respect to the unmodulated case.

Figure 3:
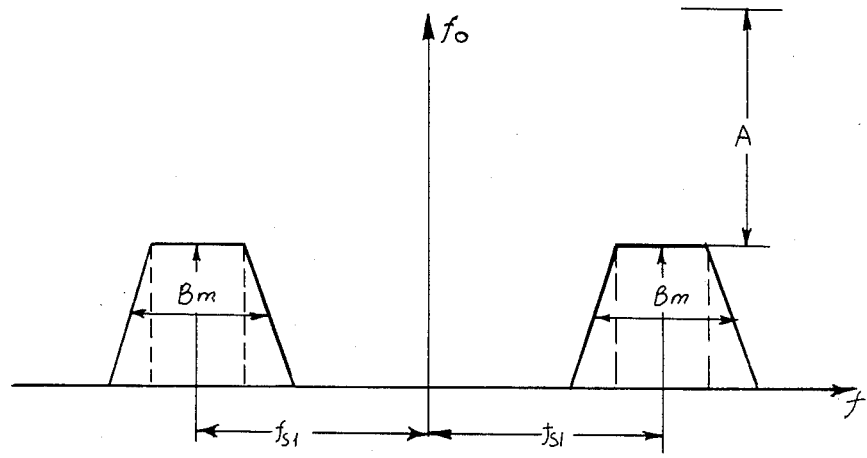
FIG. 3 is a waveform diagram of a beacon station transmitted signal spectrum (B1 of FIG. 2); and 2).

The spectrum transmitted by beacon station $B_1$, is shown in FIG. 3, which shows only the two modulation sidebands at distance $F_{S1}$ from carrier frequency fo.

Subcarrier modulation bands $f_{S1}$, Bm in width, may be present or not according to whether they transmit HSCMD telecommands or not. The difference A between carrier fo residue and modulation sidebands $f_{S1}$ levels depends on the modulation index adopted within modulator 18.

Figure 4:
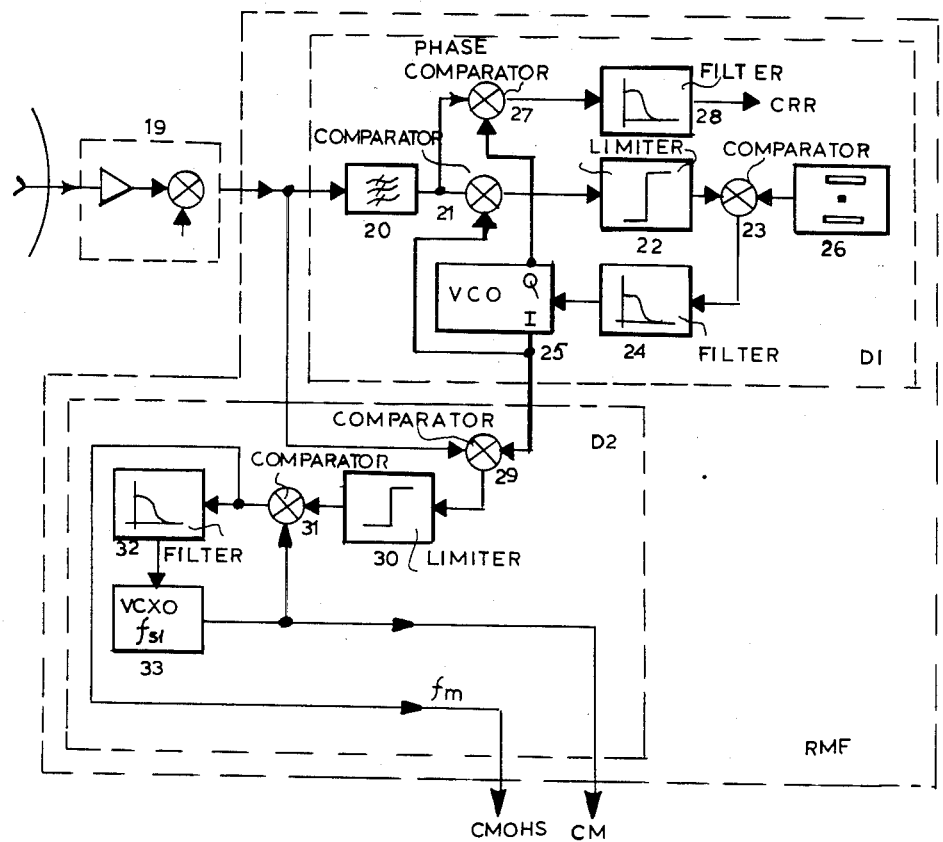
FIG. 4 is a diagram of circuitry on board the satellite.

FIG. 4 shows equipment on board the satellite including a unit 19 for amplification and frequency downconversion of the received signal.

The output from the amplified frequency converter 19 is fed to a bandpass filter 20, for blocking the sidebands $f_{S1}$ of the spectrum shown in FIG. 3.

The phase comparators; have been illustrated at 21, 23, 27, 29 and 31 while the hard limiters are seen at 22 and 30. The circuit also includes bandpass filters 28, 24 and 32, a voltage controlled oscillator (VCO) 25, a voltage controlled crystal oscillator (VCXO) 33, and a reference crystal oscillator 26.

DI shows the circuits which are commonly required within the receiver-demodulator RMF (Multi Function Receiver) to implement the functions required by the fine tracking on board antenna system, while D2 shows the circuits which must be added to RMF to recover reference signal $f_{S1}$ and base band signal fm, related to the high speed telecommands HSCMD.

According to the invention, the beacon carrier, of station B1, at frequency fo is modulated, with a subcarrier (e.g. sinusoidal) at frequency $f_{S1}$ equal to a suitable submultiple of the symbol frequency CM of the digital data streams sent to the satellite in the SS TDMA telecommunication system.

During transmission, the subcarrier frequency $f_{S1}$, modulated onto beacon carrier fo, is synchronized with the plesiochronous ground network clock, which has a stability and frequency accuracy in the order of $1 \times 10^{-11}$.

On board the satellite, the complex signal shown by the spectrum in FIG. 3 is demodulated by means of the receiver/demodulator 4–7 of the phase locked type to separately recover:
(1) amplitude modulations of carrier fo relevant to the tracking error of the receiving antenna (output ERR of block D1 in FIG. 4);
(2) subcarrier $f_{S1}$ or reference CM; and
(3) baseband signal fm which carries telecommands HSCMD in coded fashion.

The sections D1 and D2 of FIG. 4 show the circuit configuration for phase locked demodulation of the complex signal having a spectrum as per FIG. 3. In block D1, filter 20 lets through only carrier fo, whose phase is compared with that of signal I of the VCO 25 in phase detector 21. The signal at a beat frequency of the two inputs is limited in limiter 22 and sent to a second phase detector 23 where it is compared with the frequency of the signal generated by crystal oscillator 26.

The error signal at the output of comparator 23 is sent through a low pass filter 24 and there to the VCO 25 closing the phase-control loop. Output Q of VCO 25 may be sent to another phase detector 27 to achieve coherent detection of the amplitude variations of carrier fo which, after traversing low pass filter 28, is sent to output ERR. Block D2 exploits the whole spectrum present at RMF input before filter 20—i.e. inclusive of the modulation sidebands; and also exploits the fact that carrier lock is already achieved in block D1.

Phase comparator 29 outputs the beat between signal I of VCO 25 and input signal; the output of comparator 29 contains all of the signal demodulated in the sidebands of the spectrum shown in FIG. 3. The VCXO 33 oscillates freely at a frequency close to $f_{S1}$ or to one of its multiples. Comparator 31 compares the VCXO 33 signal with the output of limiter 30. Low pass filter 32, having a very narrow bandwidth, lets through only those low frequency components of the error signal required for closing of the phase loop, transferring to VCXO 33 the stability characteristics of reference signal $f_{S1}$ while it blocks modulations $f_{S1}$ from signals such as HSCMD.

Modulation spectrum Bm of FIG. 3 is therefore directly available at the output of comparator 31 for further processing on board the satellite.

With reference to FIG. 1, signal CM which contains the clock reference transported from ground to satellite, is sent to the timing circuits 9, which have the task of timing the synchronization functions of the SST DMA system—which is therefore slaved to clock signal CM recovered on board the satellites. Signal HSCMD is sent to the checker 10 which carries out decoding and interpretation of the telecommands required to operate and reconfigure the on board processor 8.

The stability with which reference signal $f_{S1}$ is received on board, CM, is shifted from the ground station emission frequency (CMO) by the Doppler component in the ground to satellite path, which is of the order of $10^{-8}$. Compared to this frequency shift, the initial CPL frequency accuracy ($10^{-11}$) is negligible. Using the frequency reference (CU) as an on board master clock, to relock data streams retransmitted by the satellite, (11 in FIG. 1) the symbol frequency of streams received on ground (CM') is affected by a frequency shift which differs from the local clock of the plesiochronous network (CPL) equal to twice the Doppler effect as the satellite to Earth relative movement affects both connections simultaneously. It is important to note that the frequency shift due to Doppler effect, changes direction twice a day due to satellite movement around its stationary point referred to ground.

This fact is more important from a practical and cost viewpoint of the ground stations than may at first be apparent.

In fact, the effect of the frequency shift of CM' frequency (at which the digital streams are received on ground) from the nominal plesiochronous network clock frequency CPL, has an impact on the dimensioning of the buffers in the digital ground interfaces (13 of FIG. 2), as these must recover the difference between bits written into the memories at the input data clock frequency (CM' in FIG. 2) and of bits read from the memory at the ground clock frequency (CPL). An important cost factor for ground terminals is to keep dimensions of such buffers within acceptable limits.

If there is a constant difference between write and read clock frequencies, ground interface buffer dimensioning should be rather generous due to progressing and indefinite filling or depleting of the buffers in time.

The effect of periodic inversion of the Doppler effect mentioned above is, on the contrary, a positive fact, because bit filling phases (write clock faster than read clock) or CM'>CPL, are followed by depletion phases of the buffers (write clock slower than the read clock) or CM'<CPL.

Over 24 hours, the average value of the frequency shift due to the Doppler effect is also nil and such is the buffer content in interface 13.

This shows that buffer dimensioning based solely on maximum fill/deplete over 6 hours, which is ¼ of the Doppler component variation period.

With typical values of orbit eccentricity, for geostationary telecommunication satellites, buffer dimensioning requires a few hundred bits for PCM data streams at a 2M bit/sec supergroup level.

The invention also has the following advantages:

(1) The independence of the synchronization signal ($f_{S1}$) transport system from the number and activation status of communication stations, since signal $f_{S1}$, is associated with the beacon carrier for the antenna tracking system; this also means that the beacon station is independent of the communication stations from a functional viewpoint.

(2) A greater insensitivity to path attenuation since the reference signal to be carried to the satellite is almost monochrome, or is at least narrowband, and the S/N ratio achievable at the satellite, with moderate Effective Isotropically Radiated Power (EIRP) from the ground station which emits the beacon signal, has high values even in the presence of additional attenuations which, in the 30 GHz band, can take on values of 30 to 35 dB. This dynamic range is much greater (by at least 10 to 15 dB) than has been achievable with synchronization signal carrier systems known until now.

(3) an improvement of performance can be achieved when two or more beacon stations are present in the system as shown in FIG. 1.

As beacon site stations are not located at the same place, reception and on board demodulation of subcarriers associated with beacon station emissions permits implementation of a system which exploits space diversity characteristics.

In a nutshell, the invention has the advantage that simultaneous failure probability of the two beacon stations and/or the probability of simultaneous additional attenuation due to rainfall at the two sites is very low or even negligible.

Under these conditions the availability at the satellite of the reference signal used for bit and frame synchronization increases considerably with equal ground station EIRP; and it also reduces EIRP requirements for the spectral line connected to the subcarrier at the same required service availability.

Also the reliability with which such function is performed on board the satellite increases as two reference signals are simultaneously available between which the on board equipment may choose. In other words the two reference signals may be considered to provide operational redundancy. The above also applies to the high speed telecommand function which in this configuration exploits the same operational redundancy characteristics of the two independent subcarrier receiver-demodulation chains.

I claim:

1. A satellite-switched time-division multiple access communication system, comprising:

a satellite having a generally geostationary orbit;

a plurality of ground communication stations having respective ground communication antennae trained upon said satellite;

a plurality of ground beacon stations separate from one another and independent from said ground communication stations and having respective ground beacon antennae trained upon said satellite;

on-board antenna means including at least one on-board satellite fine-tracking antenna on said satellite for receiving signals from said ground antennae and transmitting signals at least to said communication antennae;

a reconfigurable on-board processor on said satellite for processing and switching information received from at least one of said communication antennae and retransmitting said information to at least another one of said communication antenna;

demodulation/regeneration means connected to said antenna means for transmitting communication signals to said processor;

remodulation means connected to said processor for delivering retransmitted communication signals representing the retransmitted information to said antenna means, said digital demodulation/regeneration means, said processor and said remodulation means forming a satellite switching system for time division multiple access communication between said communication stations;

a beacon carrier generator at each of said ground beacon stations for generating a respective radio-frequency beacon carrier signal ($f_o$) for fine-tracking control of said on-board fine-tracking antenna;

modulator means at each of said ground beacon stations for modulation of a subcarrier ($CM_o$) forming a reference clock signal with a high-speed telecommand signal (HSCMD) for controlling said on-board processor and for modulating, in turn, said beacon carrier signal ($f_o$) with the subcarrier ($CM_o$) as modulated by the high-speed telecommand signal (HSCMD) to form a transmitted modulated signal transmitted by the respective ground beacon antenna to the on-board antenna system;

respective on-board demodulators forming part of a radio-frequency receiver receiving the transmitted modulated signals transmitted by the respective ground beacon antennas and demodulating same to recover an antenna-control signal (ERR) for fine control of said on-board in response to said carrier ($f_0$), a clock signal (CM) at a communication symbol frequency as determined by the frequency of said subcarrier ($CM_o$), and the telecommand signal (HSCMD);

on-board selecting means on the satellite connected to said on-board demodulators for selecting among the demodulated signals for utilization of the qualitatively better of the signals selected between;

decoder means connected to said on-board selecting means and responsive to said telecommand signal (HSCMD) for controlling said processor to effect time division multiple access communication switching between said communication stations; and synchronizing means connected to said on-board selecting means and responsive to said clock signal (CM) for synchronizing said digital demodulation/regeneration means, said processor and said remodulation means.

2. The communication system defined in claim 1 wherein the subcarrier modulating the carrier (fo) sent by the beacon station, has a frequency which is a submultiple of the symbol frequency of the digital streams which modulate carriers arriving in time division multiple access to the satellite and is synchronized on ground to a plesiochronous network clock frequency CPL of a network formed by said ground station.

3. The communication system defined in claim 1 wherein the subcarrier is modulated by a data stream of a telecommand channel which can deliver thousands of bits per second.

4. The communication system defined in claim 1 wherein subcarrier demodulated on board the satellite is used to phase lock a free running oscillator to a frequency close to that of the subcarrier.

* * * * *